Patented Oct. 24, 1939

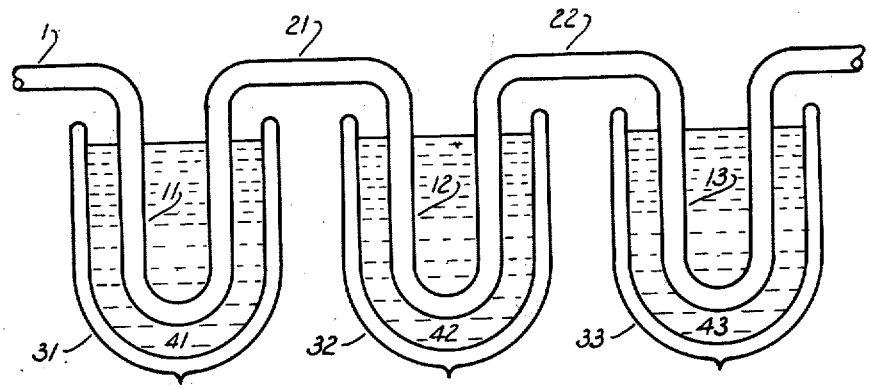
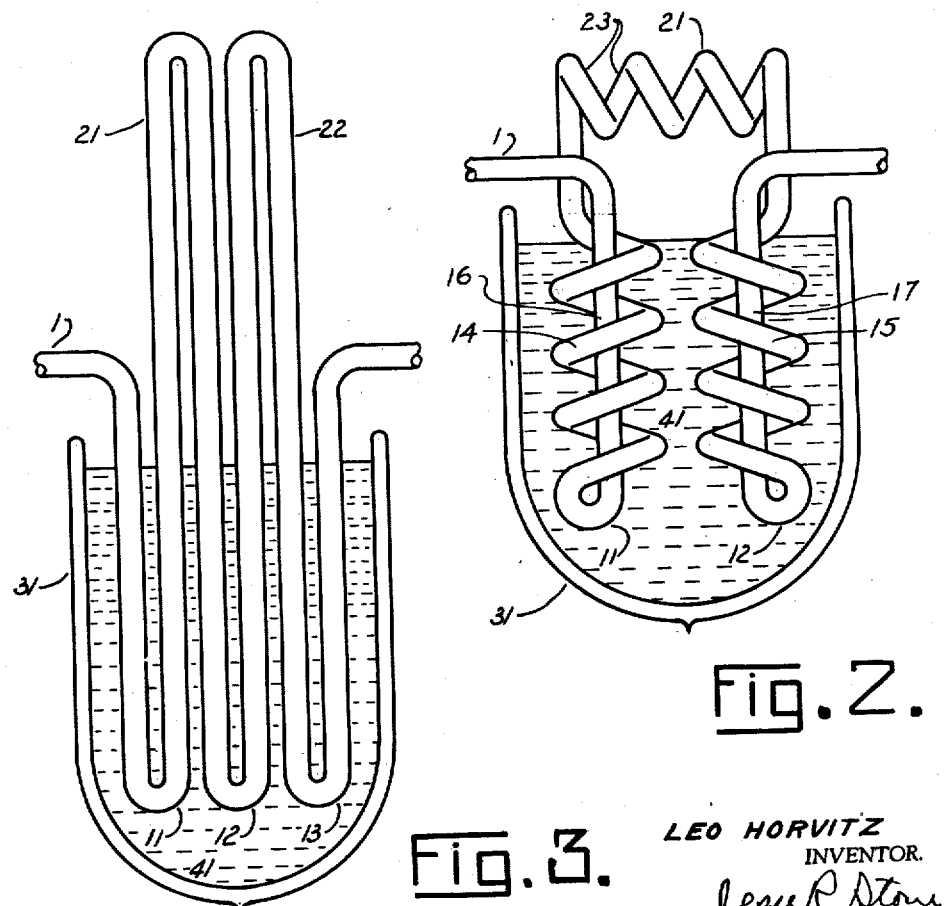

2,177,139

UNITED STATES PATENT OFFICE 2,177,139

GAS SEPARATION

Leo Horvitz, Houston, Tex., assignor, by mesne assignments, to E. E. Rosaire, Houston, Tex.

Application February 8, 1937, Serial No. 124,652

7 Claims. (Cl. 62—175.5)

The invention relates to the field of chemical analysis and more specifically to the field of separation of the components of gaseous mixtures.

An object of the invention is to provide a method of and apparatus for effecting complete separation of the components of a gaseous mixture.

A more specific object is to separate the components of gaseous mixtures by stages, the residue of the desired gas or gases from a preceding stage being partially removed in a succeeding stage or stages.

It is also an object to separate desired components from a gaseous mixture by freezing and collecting portions of such components in each of successive stages.

A further object is to effect separation by successive stages of desired components of a gaseous mixture by freezing of certain components in the respective stages and revaporizing any residue of the gas passing between the stages in solid form.

Other and further objects, together with the foregoing, will be apparent from the following description taken in connection with the drawing in which:

Fig. 1 is an illustration of the apparatus employed in practicing the process of the invention.

Figs. 2 and 3 are alternative forms of the specific embodiment of the invention illustrated in Fig. 1.

In the study of gases and in many industrial operations it is desirable or necessary to completely remove a given component or components forming gaseous mixtures. Likewise, it is frequently desirable to ascertain the amount of a given gas in a gaseous mixture wherein the gas to be measured is of an extremely low concentration. In either case difficulty has been experienced in effectively separating the component or components from the gaseous mixture.

The method frequently practiced is that of separation by fractional freezing wherein the gas undergoing treatment is subjected to a low temperature whereby a certain component or components are liberated and collected by freezing.

It has been assumed heretofore that if adequate trap area exists, when separating gases by fractional freezing, the only limitation to complete removal of a given gaseous component was the vapor pressure of that component at the temperature of the freezing bath. Further, if removal were not complete it has been supposed that a reduction of temperature or increase in trap area would accomplish the more complete removal.

Recently conducted experiments show that complete removal has not followed from an increased area of trap, even at temperatures permitting only a negligible vapor pressure of the material frozen out. This invention is concerned primarily with the complete removal of carbon dioxide from a gaseous mixture prior to a quantitative analysis. It is to be understood, however, that the invention is not limited to the removal of carbon dioxide, this particular gas being referred to by way of illustration only. In practicing the invention a trap, or tubular coil, immersed in liquid air at temperatures between $-180°$ and $-190°$ centigrade is used. By this procedure carbon dioxide is frozen out to a snow, the solid phase, with a vapor pressure less than $1 \times 10^{-4}$ or even $1 \times 10^{-5}$ millimeters of mercury. Theoretically, this treatment should completely remove the carbon dioxide. However, careful analysis shows that appreciable traces pass through the trap along the gaseous components from which the carbon dioxide should have been separated.

It has been found that by means of the present invention complete removal of carbon dioxide from a gaseous mixture can be accomplished, the method of and the apparatus for practicing the invention being illustrated in the drawing and the description now presented.

Fig. 1 shows successive traps, generally designated as 11, 12 and 13, in flow line 1, through which the gaseous mixture to be processed is passed. This flow line 1 is illustrated as a glass tube which may be a hollow member of any suitable material and configuration. The trap portions 11, 12 and 13 are immersed in liquid air or other freezing medium 41, 42 and 43 in vacuum bottles 31, 32, 33, respectively. Intervening the successive freezing stages are reheating or revaporizing stages 21, 22 which are employed to revaporize any frozen material blown or carried past the preceding trap or traps. Any suitable mode of effecting desired heating in the revaporizing stages 21, 22, may be resorted to, as is well known in the art, and the flow line 1 in these stages may assume any desired configuration to obtain the necessary revaporization of the solids passing through this portion of the flow line.

In the modifications shown in Figs. 2 and 3, the construction is such that a single vacuum bottle 31 is used for the freezing medium 41 and all the traps are immersed in this single body of liquid.

In Fig. 2 but two traps 11 and 12 are provided for extracting heat from the processed gases and for collecting the solidified components of the gases. These traps are especially constructed in order to present a larger area to the freezing medium 41 whereby greater effectiveness in the fractional freezing accrues. This specific construction comprises the provision of spiral rises 14 and 15 about the downwardly extending legs 16 and 17 of the inlet and outlet portions of flow line 1. Similarly, the revaporizing stage 21 is spiralled as at 23 to enhance the application of heat between the freezing stages to revaporize frozen material carried thereto by the preceding trap.

The modification shown in Fig. 3 is similar to the form illustrated by Fig. 1 but comprehends a more compact arrangement of component parts whereby traps 11, 12 and 13 are immersed in a single body of freezing liquid 41 in vacuum bottle 31. This compact arrangement also provides juxtaposition of the revaporizing stages 21, 22 whereby more compact heating means or a single heating unit may be utilized for providing the necessary heat for revaporization of the frozen material passing through successive freezing stages or traps.

The procedure carried out by the described apparatus is believed necessary because the carbon dioxide snow can be carried appreciable distances at liquid air temperatures by a stream of gas, even when the gas is moving at a low velocity. A part of the snow fails to settle out or adhere to the walls of the trap, thus remaining suspended in the moving gas stream so that a mere lengthening of the coil or trap would fail to increase the effectiveness of the trap except by a negligible amount. But if the uncollected snow or vapor that would be permitted to pass out of the trap, is warmed and changed over to the vapor phase, and then passed through a subsequent trap, it is readily frozen out and collected. Depending upon the completeness of removal necessary, additional reheating and freezing stages may be provided.

By way of explanation of this invention and comparison with the procedure heretofore practiced, the laws believed to apply to the two cases will be given.

Suppose that a trap is to be lengthened in an effort to increase its efficiency. Let the factor by which it is to be lengthened be $n$. This is the equivalent of $n$ contiguous traps without intervening reheating stages. In this case the amount of a given gaseous component $Q$, which passes a series of $n$ traps in the usual separation of gases by fractional freezing is approximated by:

$$Q = (a + b/nl) Q_o \qquad (1)$$

where $Q_o$ is the amount of a gaseous component to be eliminated which enters the first of said series of traps $a$ is a constant representing the fraction blown by or carried through in other than gaseous form $b$ is a constant representing the efficiency per unit length of trap $l$ is the length of trap.

It is evident that the quantity $Q$ is an appreciable fraction of $Q_o$ if the constant $a$ is appreciable, regardless of the magnitude of $nl$.

When reheating stages between freezing traps are used in accordance with the present invention, it appears that the amount of a given gaseous component, $Q$, that passes a series of $n$ traps is approximated by:

$$Q = (a + b/l)^n Q_o \qquad (2)$$

where $Q$, $a$, $b$, $l$ and $n$ are the same as for the preceding equation. Here the value $n$ appears as an exponent instead of a mere factor, and since $(a+b/l)$ is very small compared with unity, the quantity in parentheses in the equation becomes vanishingly small even when the number of traps $n$ is small.

For example, suppose $$(a+b/l) = 1/1000$$

then for only two traps $$Q/Q_o = 1/1,000,000$$

which indicates that only one part per million fails to be trapped.

On the other hand a mere lengthening of a single trap, or multiplication of traps without reheating stages would result in the ratio $$Q/Q_o = 1/2000$$

which shows that 500 parts per million fails to be trapped. It is therefore apparent that by means of the process and apparatus of the present invention the effectiveness of separation is greatly increased.

Analyses frequently call for an accuracy of the order of one part, or less, per million so that this invention fills an important need. In practicing the present invention it has been found possible to reduce the quantity of carbon dioxide to less than one part per million parts of total gaseous mixture.

While the invention has been specifically described as being applicable to the separation of carbon dioxide from other components of gaseous mixture, the invention is not limited thereto but is also applicable to the separation of many other substances which can be frozen out, such as water vapor, ethane, propane, etc. It is also applicable to the method of separation by liquefaction of such components as water vapor, mercury vapor, alcohols, etc. It is also within the scope of the invention to apply it to those substances which evaporate from a liquid phase, such as water above 0° C., and other substances which have a liquid phase between the solid and gaseous states.

It is also desirable, at times, to separate out two or more components from a gaseous mixture in a single operation. The invention is very useful for this case whenever the two components are amenable to such extraction. Such cases frequently arise, as for example, when it is desired to remove carbon dioxide and water vapor.

Furthermore, when two or more constituents are being eliminated simultaneously, both may be trapped in the solid state, in the liquid state, or one or more in the solid state and the others in a liquid state. Thus, for example, in trapping vapors of ethyl alcohol and mercury, within a given range of temperatures the mercury would be trapped as a solid and the alcohol as a liquid.

What is claimed is:

1. The method of removing carbon dioxide from a gaseous mixture which comprises the steps of reducing the carbon dioxide to a solid phase of low vapor pressure, collecting such solid, revaporizing that portion which is carried past the first solidifying stage, and subsequently resolidifying and collecting the portion which was carried over.

2. The method of removing a component from a gaseous mixture which comprises the step of reducing that component to a solid phase of low vapor pressure and collecting such solid, repeating said reducing and collecting step, and between said repeated steps revaporizing such solid as has failed to be collected in the preceding step.

3. Means for removing carbon dioxide from a gaseous mixture comprising a plurality of means operating successively for solidifying and collecting the carbon dioxide, and intervening means for vaporizing such carbon dioxide as has been blown or carried through the previous solidifying and collecting means.

4. Means for removing a gaseous component from a gaseous mixture comprising a plurality of means operating successively for solidifying or liquefying and collecting said component, said means comprising successive traps and cooling means therefor and means intermediate successive traps for revaporizing such part of said component which has been blown or carried through the previous collecting means.

5. Means for removing a component from a gaseous mixture comprising a plurality of means operating successively for solidifying and collecting such component, and intervening means for revaporizing such solid as has been blown or carried past the previous solidifying and collecting means.

6. The method of removing a component from a gaseous mixture comprising the steps of, subjecting the mixture to a temperature at which the component is liquefied and exerts a low vapor pressure, collecting the liquid so formed, reheating the remaining gas to revaporize any condensed liquid carried past the liquefying stage, and subjecting the remaining mixed gases to a temperature at which any of the component carried past the first liquefying stage is liquefied and collected.

7. The method of removing components from a gaseous mixture comprising the steps of subjecting the mixture to a temperature at which the components are reduced to non-gaseous phases of low vapor pressure, collecting the non-gaseous residues, subjecting the remaining gas to a reheating step and revaporizing any non-gaseous residue which is carried past the first reducing and collecting step, and again subjecting the gas to a temperature at which any of the components carried past the first reducing and collecting stage are reduced and collected.

LEO HORVITZ.

DISCLAIMER 2,177,139.—*Leo Horvitz*, Houston, Tex. GAS SEPARATION. Patent dated October 24, 1939. Disclaimer filed August 5, 1941, by the assignee, *Standard Oil Development Company*.

Hereby enters this disclaimer to that part of claims 1, 2, 6, and 7 which is in the following words, to wit:

Claim 1. "and subsequently resolidifying and collecting the portion which was carried over", except insofar as this step is carried out in a zone separate and distinct from the zone in which the first solidification stage is conducted.

Claim 2. "repeating said reducing and collecting step,", except insofar as this step is carried out in a zone separate and distinct from the zone in which the first reducing and collecting stage is conducted.

Claim 6. "and subjecting the remaining mixed gases to a temperature at which any of the component carried past the first liquefying stage is liquefied and collected", except insofar as this step is carried out in a zone separate and distinct from that in which the first liquefying stage is effected.

Claim 7. "and again subjecting the gas to a temperature at which any of the components carried past the first reducing and collecting stage are reduced and collected", except insofar as this step is carried out in a zone separate and distinct from the zone in which the first reducing and collecting stage is effected.

[*Official Gazette August 26, 1941.*]

2. The method of removing a component from a gaseous mixture which comprises the step of reducing that component to a solid phase of low vapor pressure and collecting such solid, repeating said reducing and collecting step, and between said repeated steps revaporizing such solid as has failed to be collected in the preceding step.

3. Means for removing carbon dioxide from a gaseous mixture comprising a plurality of means operating successively for solidifying and collecting the carbon dioxide, and intervening means for vaporizing such carbon dioxide as has been blown or carried through the previous solidifying and collecting means.

4. Means for removing a gaseous component from a gaseous mixture comprising a plurality of means operating successively for solidifying or liquefying and collecting said component, said means comprising successive traps and cooling means therefor and means intermediate successive traps for revaporizing such part of said component which has been blown or carried through the previous collecting means.

5. Means for removing a component from a gaseous mixture comprising a plurality of means operating successively for solidifying and collecting such component, and intervening means for revaporizing such solid as has been blown or carried past the previous solidifying and collecting means.

6. The method of removing a component from a gaseous mixture comprising the steps of, subjecting the mixture to a temperature at which the component is liquefied and exerts a low vapor pressure, collecting the liquid so formed, reheating the remaining gas to revaporize any condensed liquid carried past the liquefying stage, and subjecting the remaining mixed gases to a temperature at which any of the component carried past the first liquefying stage is liquefied and collected.

7. The method of removing components from a gaseous mixture comprising the steps of subjecting the mixture to a temperature at which the components are reduced to non-gaseous phases of low vapor pressure, collecting the non-gaseous residues, subjecting the remaining gas to a reheating step and revaporizing any non-gaseous residue which is carried past the first reducing and collecting step, and again subjecting the gas to a temperature at which any of the components carried past the first reducing and collecting stage are reduced and collected.

LEO HORVITZ.

DISCLAIMER 2,177,139.—*Leo Horvitz*, Houston, Tex. GAS SEPARATION. Patent dated October 24, 1939. Disclaimer filed August 5, 1941, by the assignee, *Standard Oil Development Company*.

Hereby enters this disclaimer to that part of claims 1, 2, 6, and 7 which is in the following words, to wit:

Claim 1. "and subsequently resolidifying and collecting the portion which was carried over", except insofar as this step is carried out in a zone separate and distinct from the zone in which the first solidification stage is conducted.

Claim 2. "repeating said reducing and collecting step,", except insofar as this step is carried out in a zone separate and distinct from the zone in which the first reducing and collecting stage is conducted.

Claim 6. "and subjecting the remaining mixed gases to a temperature at which any of the component carried past the first liquefying stage is liquefied and collected", except insofar as this step is carried out in a zone separate and distinct from that in which the first liquefying stage is effected.

Claim 7. "and again subjecting the gas to a temperature at which any of the components carried past the first reducing and collecting stage are reduced and collected", except insofar as this step is carried out in a zone separate and distinct from the zone in which the first reducing and collecting stage is effected.

[*Official Gazette August 26, 1941.*]